United States Patent
Berthelot et al.

(10) Patent No.: US 8,747,954 B2
(45) Date of Patent: Jun. 10, 2014

(54) PROCESS FOR THE PREPARATION OF AN ORGANIC FILM AT THE SURFACE OF A SOLID SUPPORT WITH OXIDIZING TREATMENT

(75) Inventors: Thomas Berthelot, Villebon sur Yvette (FR); Alexandre Garcia, Ivry sur Seine (FR); Sebastien Roussel, Soisy sur Seine (FR); Fabien Nekelson, Paris (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 565 days.

(21) Appl. No.: 12/772,124

(22) Filed: Apr. 30, 2010

(65) Prior Publication Data

US 2010/0323119 A1  Dec. 23, 2010

(30) Foreign Application Priority Data

Apr. 30, 2009  (FR) ...................... 09 52891
Jan. 15, 2010  (FR) ...................... 10 50279

(51) Int. Cl.
B05D 1/36  (2006.01)

(52) U.S. Cl.
USPC ........................................ 427/407.1

(58) Field of Classification Search
CPC ................................. B05D 3/00; B05D 3/101
USPC ................................................... 427/407.1
See application file for complete search history.

(56) References Cited

U.S. PATENT DOCUMENTS 5,496,581 A * 3/1996 Yianni et al. ................. 427/2.12
2002/0160295 A1 10/2002 Aoshima et al.
2003/0091750 A1 * 5/2003 Chen ......................... 427/430.1
2004/0248428 A1 12/2004 Bureau et al.
2007/0281148 A1 12/2007 Bureau et al.
2008/0124832 A1 5/2008 Deniau et al.
2008/0145706 A1 * 6/2008 Mevellec et al. ............. 428/704
2008/0193668 A1 8/2008 Mevellec et al.
2008/0249272 A1 10/2008 Bureau et al.

FOREIGN PATENT DOCUMENTS

| FR | 2910011 A1 | 6/2008 |
| WO | WO 03/018212 A1 | 3/2003 |
| WO | WO 2005/033378 A1 | 4/2005 |
| WO | WO 2006/097611 A2 | 9/2006 |
| WO | WO 2007/042659 A1 | 4/2007 |
| WO | WO 2008/078052 A2 | 7/2008 |

OTHER PUBLICATIONS

Phunkum, J., "A study to improve adhesion between surface grafted polyethylene and epoxy resin", Thesis Paper, Mahldol University, Oct. 2005.*

Palacin et al., "Molecule-to-Metal Bonds: Electrografting Polymers on Conducting Surfaces," A European Journal "ChemPhysChem" of Chemical Physics and Physical Chemistry, vol. 5, 2004, pp. 1468-1481.

(Continued)

Primary Examiner — Michael Cleveland
Assistant Examiner — James M Mellott
(74) Attorney, Agent, or Firm — Nixon Peabody LLP

(57) ABSTRACT

The present invention relates to a process for the preparation of an organic film on a portion of the surface of a solid support made of (co)polymer, characterized in that it comprises the successive steps consisting in (i) subjecting said surface portion to an oxidizing treatment and (ii) grafting an organic film to said surface portion by radical chemical grafting.

18 Claims, 2 Drawing Sheets

(56) References Cited

OTHER PUBLICATIONS

Deniau et al., "Carbon-to-Metal Bonds: Electrochemical Reduction of 2-Butenenitrile," Surface Science, vol. 600, 2006, pp. 675-684.
Naudin, C. A. "Nomenclature, Classification et Formules Chimiques Des Polymers," [Nomenclature, Classification and Chemical Formulae of Polymers], Techniques de l'Ingenieur, traite Plastiques and Composites, 1995, pp. A3 035.1-035.16.
Brewis et al., "A review of Electrochemical Pretreatments of Polymers," International Journal of Adhesion & Adhesives, vol. 21, 2001, pp. 397-409.
Zenkiewicz et al., "Effects of Electron-Beam Irradiation on Surface Oxidation of Polymer Composites," Applied Surface Science, vol. 253, 2007, pp. 8992-8999.
French Search Report in French Application No. FR 0952891, dated Nov. 30, 2009.
French Search Report in French Application No. FR 1050279, dated Jun. 22, 2010.
International Search Report in International Application No. PCT/EP2010/055921, dated Jun. 22, 2010.
Gao, C., "Facile and Large-Scale Synthesis and Characterization of Carbon Nanotube/Silver Nanocrystal Nanohybrids," Institute of Physics Publishing, Nanotechnology 17, 2006, pp. 2882-2890.
Mevellec, V. et al., "Grafting Polymers on Surfaces: A New Powerful and Versatile Diazonium Salt-Based One-Step Process in Aqueous Media," Chemistry of Materials, vol. 19, No. 25, Dec. 2007, pp. 6323-6330.
Phunkum, J., "A Study to Improve Adhesion Between Surface Grafted Polyethylene and Epoxy Resin," Thesis Paper, Mahidol University, Oct. 2005, 114 pages.
Pinson, J. et al., "Attachment of Organic Layers to Conductive or Semiconductive Surfaces by Reduction of Diazonium Salts," The Journal of the Royal Society of Chemistry Review, vol. 34, 2005, pp. 429-439.
Sun, W. et al., "Preparing Polymer Brushes on Polytetrafluoroethylene Films by Free Radical Polymerization," Applied Surface Science, vol. 253, No. 2, Nov. 2006, pp. 983-988.

* cited by examiner

PROCESS FOR THE PREPARATION OF AN ORGANIC FILM AT THE SURFACE OF A SOLID SUPPORT WITH OXIDIZING TREATMENT

CROSS REFERENCE TO RELATED APPLICATIONS OR PRIORITY CLAIM

This application claims priority of French Patent Application No. 09 52891, filed Apr. 30, 2009 and French Patent Application No. 10 50279, filed Jan. 15, 2010.

TECHNICAL FIELD

The present invention relates to the field of organic surface coatings, said coatings being in the form of organic films.

It relates more particularly to a process for the preparation of such organic coatings by coating on electrically conducting or nonconducting surfaces, advantageously surfaces made of plastics or polymers, with a preliminary step of oxidizing treatment of the surfaces.

PRIOR ART

There currently exist several techniques which make possible the preparation of thin organic films on substrates.

Some techniques, applicable to any type of surface, do not require an affinity between the film and the coated surface and involve only a physisorption between these two components. These techniques include the process of formation of a coating by centrifuging ("spin coating"), of formation of a coating by immersion ("dip coating") or of deposition by vaporization ("spray coating"). There thus exists no actual grafting between the film and the coated surface and the thicknesses produced cannot be easily controlled, in particular for the thinnest deposited layers (less than 20 nm).

Other techniques for the formation of an organic coating at the surface of a support, such as plasma deposition or photochemical activation (or photoactivation), are based on the same principle: generating unstable forms of a precursor close to the surface to be covered, which unstable forms change with the formation of a film on the substrate. These techniques generally give rise to the formation of adherent films, although it is usually impossible to discern whether this adhesion is due to crosslinking of a film topologically closed around the object or to true formation of bonds at the interface. Furthermore, these methods require specific precursors, in particular photosensitive precursors for the photoactivation, relatively complex and expensive pretreatments, the use of vacuum devices under vacuum for the plasma methods, irradiation and/or the use of potentiostats for the electrochemical methods, with which numerous problems of connection are associated.

Cataphoresis is a technique also employed for coating conductive surfaces with organic films. Cataphoresis or cationic electrodeposition process makes it possible to cover metal parts using charged polymers, synthesized prior to their deposition, and gives access to uniform films on conductive surfaces. However, in addition to strict control of the electrodeposition conditions, the treatment requires an additional stoving step in order to confer physical strength or chemical resistance on the electrodeposited film.

The self-assembling of monolayers is a technique which is very simple to carry out but which requires the use of generally molecular precursors having a sufficient affinity for the surface of interest to be coated. The term used will then be "precursor-surface pair", such as sulfur compounds, in particular exhibiting a thiol functional group, having an affinity for gold or silver, trihalosilanes for oxides, such as silica or alumina, or polyaromatics for graphite or carbon nanotubes. In all cases, the formation of a film of molecular thickness (less than 10 nm) is based on a specific chemical reaction between a part of the precursor molecule and certain "receptor" sites of the surface. A chemisorption reaction ensures the attachment. However, the interfacial bonding between the surface and the monomolecular film may be weak for certain pairs or weakened by specific environmental conditions, in particular humid conditions.

The electrografting of polymers is a technique based on the initiation and then the polymerization, by chain propagation, which is electroinduced, of electroactive monomers on the surface of interest, which acts both as electrode and as polymerization initiator [1]. Electrografting requires the use of precursors suited to its mechanism of initiation by reduction and of propagation. The adhesion of the electrografted films is provided by a carbon-metal covalent bond [2]. Among the various techniques recalled above, electrografting is the only technique which makes it possible to produce grafted films with specific control of the interfacial bonding. Specifically, the only technique which makes it possible to graft films of polymers resulting from activated vinyl monomers to surfaces, necessarily conductive surfaces, consists in electroinitiating the polymerization reaction starting from the surface, via a potentiostat, followed by growth of the chains monomer by monomer, requiring the use of an electrochemical cell with a cathode and an anode and also application of a voltage to the terminals of the latter. Thus, international application WO 03/018212 describes in particular a process for grafting and growing a conductive organic film on an electrically conducting surface, the grafting and the growth being carried out simultaneously by electroreduction of a precursor diazonium salt of said organic film [3].

Finally, a process which makes it possible to produce grafted organic coatings under nonelectrochemical conditions and which is easy to carry out on any type of surface has recently been described. This process, described in particular in international application WO 2008/078052, involves radical chemical grafting which makes possible covalent grafting in a simple step [4].

This novel technique employs molecular entities resulting in particular from cleavable aryl salts, such as diazonium salts, having an unpaired electron, to form bonds of covalent bond type with the surface of interest to be grafted, said molecular entities being generated independently of the surface to which they are intended to be grafted. These molecular entities become grafted to the surface and initiate a radical reaction involving in particular ethylenic monomers.

The inventors have continued their studies in order to identify any means and/or any step which makes it possible to further improve the process described in international application WO 2008/078052.

DESCRIPTION OF THE INVENTION

Thus, the present invention relates to an improved process for grafting, under non-electrochemical conditions, an organic film to at least a portion of the surface of a solid support.

This is because the studies of the inventors have shown that an oxidizing pretreatment of the surface of a solid support makes it possible to improve the grafting of an organic film and/or to increase the thickness and thus the amount of organic film grafted to said portion in a process as described in international application WO 2008/078052 [4]. Such an oxidizing treatment is applied more particularly to the surface of a solid support and/or to a solid support made of polymer, such as a plastic.

Without wishing to be committed to any one theory, the use of an oxidizing pretreatment makes possible a better attachment of the process as described in international application WO 2008/078052 [4]. Furthermore, because of a greater reactivity of the surface to be grafted, the use of an oxidizing pretreatment makes it possible to lower the normal reaction times of the process as described in international application WO 2008/078052 [4].

Thus, the present invention relates to a process for the preparation of an organic film on a portion of the surface of a solid support made of (co)polymer, characterized in that it comprises the successive steps consisting in:
  i) subjecting said surface portion to an oxidizing treatment;
  ii) grafting an organic film to said surface portion by radical chemical grafting.

The term "surface of a solid support made of (co)polymer" is understood to mean both a solid support made of (co)polymer or a solid support having just the surface made of (co)polymer, it being possible for the remainder of the support to be made of any material. The solid support according to the present invention can have any size and shape.

The term "made of (co)polymer" is understood to mean, in the context of the present invention, a support or a surface essentially composed of just one (co)polymer or several different (co)polymers.

The term "essentially composed" is understood to mean, in the context of the present invention, a support or a surface where in at least 50%, at least 60%, at least 70%, at least 80%, at least 90%, at least 95%, and/or at least 98% of the constituents, expressed by weight, are one (or more) (co)polymer(s).

Advantageously, the support or the surface of the support is only constituted by one (or more) (co)polymer(s).

In an alternative form, the support or the surface of the support comprises, in addition to one (or more) (co)polymer(s), at least one component chosen from the group consisting of fillers, plasticizers and additives. This (or these) additional component(s) is (are) advantageously incorporated and/or dispersed in the polymer material.

As a reminder, a plastic is formed of at least one (co)polymer advantageously exhibiting a degree of polymerization of greater than 3000 and of at least one additive. Consequently, the support or the surface of the support made of polymer implemented in the context of the present invention comprises the supports or the support surfaces made of plastic.

Inorganic fillers, such as silica, talc, glass fibers or glass beads, or organic fillers, such as cereal flour or cellulose pulp, are generally used to reduce the cost and to improve certain properties, such as the mechanical properties, of the polymer material. Additives are mainly used to improve a specific property of the polymer material, it being possible for said property to be the crosslinking, the slip, the resistance to decomposition, the flame resistance and/or the resistance to bacterial and fungal attacks.

Any natural (such as latex or rubber), artificial, synthetic, thermoplastic, thermosetting, thermostable, elastomeric, linear (i.e. linear or branched, one-dimensional) and/or three-dimensional polymer can be used in the context of the present invention.

Advantageously, the (co)polymer implemented in the context of the present invention is a thermoplastic (co)polymer chosen from the group consisting of:
  a polyolefin, such as a polyethylene, a polypropylene, an ethylene/propylene copolymer, a polybutylene, a poly-methylpentene, an ethylene/vinyl acetate copolymer, an ethylene/vinyl alcohol copolymer, one of their derivatives, one of their copolymers, one of their blends and one of their combinations;
  a polyester, such as a polyethylene terephthalate (PET), optionally modified by glycol, a polybutylene terephthalate, a polylactide, a polycarbonate, one of their copolymers, one of their blends and one of their combinations;
  a polyether, such as a poly(oxymethylene), a poly(oxyethylene), a poly(oxypropylene), a poly(phenylene ether), one of their copolymers, one of their blends and one of their combinations;
  a vinyl polymer, such as a poly(vinyl chloride), which is optionally chlorinated, a poly(vinyl alcohol), a poly(vinyl acetate), a poly(vinyl acetal), a poly(vinyl formal), a poly(vinyl fluoride), a poly(vinyl chloride/vinyl acetate), one of their copolymers, one of their blends and one of their combinations;
  a vinylidene polymer, such as a poly(vinylidene chloride), a poly(vinylidene fluoride), one of their copolymers, one of their blends and one of their combinations;
  a styrene polymer, such as a polystyrene, a poly(styrene/butadiene), a poly(acrylonitrile/butadiene/styrene) (ABS), an acrylonitrile/butadiene/styrene-polycarbonate (ABS/PC), a poly(acrylonitrile/styrene), a poly(acrylonitrile/ethylene/propylene/styrene), a poly(acrylonitrile/styrene/acrylate), one of their copolymers, one of their blends and one of their combinations;
  a (meth)acrylic polymer, such as a polyacrylonitrile, a poly(methyl acrylate), a poly(methyl methacrylate), one of their derivatives, one of their copolymers, one of their blends and one of their combinations;
  a polyamide, such as a poly(caprolactam), a poly(hexamethylene adipamide), a poly(lauroamide), a polyether-block-amide, a poly(meta-xylylene adipamide), a poly(meta-phenylene isophthalamide), one of their copolymers, one of their blends and one of their combinations;
  a fluoropolymer (or polyfluoroethene), such as a polytetrafluoroethylene, a polychlorotrifluoroethylene, a perfluorinated poly(ethylene/propylene), a poly(vinylidene fluoride) (PVDF), one of their copolymers [such as copolymers of tetrafluoroethylene and of tetrafluoropropylene (FEP), copolymers of ethylene and of tetrafluoroethylene (ETFE), copolymers of hexafluoropropene and of vinylidene fluoride (HFP-co-VDF), copolymers of vinylidene fluoride and of trifluoroethylene (VDF-co-TrFE) and copolymers of vinylidene fluoride, of trifluoroethylene and of monochlorotrifluoroethylene (VDF-co-TrFE-co-chloro-TrFE)], one of their blends and one of their combinations;
  a cellulose polymer, such as a cellulose acetate, a cellulose nitrate, a methylcellulose, a carboxymethylcellulose, one of their copolymers, one of their blends and one of their combinations;
  a poly(arylene sulfone), such as a polysulfone, a polyethersulfone, a polyarylsulfone, one of their copolymers, one of their blends and one of their combinations;
  a polysulfide, such as poly(phenylene sulfide);
  a poly(aryl ether) ketone, such as a poly(ether ketone), a poly(ether ether ketone), a poly(ether ketone ketone), one of their copolymers, one of their blends and one of their combinations;
  a polyamide-imide;
  a poly(ether)imide;
  a polybenzimidazole;
  a poly(indene/coumarone);

a poly(para-xylylene);
one of their copolymers, one of their blends and one of their combinations.

In an alternative form, the (co)polymer implemented in the context of the present invention is a thermosetting (co)polymer chosen from the group consisting of an aminoplast, such as urea/formaldehyde, melamine/formaldehyde, melamine/formaldehyde-polyesters, one of their copolymers, one of their blends and one of their combinations; a polyurethane; an unsaturated polyester; a polysiloxane; a phenol/formaldehyde, epoxide, allyl or vinyl ester resin; an alkyd; a polyurea; a polyisocyanurate; a poly(bismaleimide); a polybenzimidazole; a polydicyclopentadiene; one of their copolymers, one of their blends and one of their combinations.

Likewise, the present invention can be implemented using (co)polymers carrying basic groups, such as tertiary or secondary amines, for example pyridines, such as poly(4-vinylpyridine)s and poly(2-vinylpyridine)s (P4VP and P2VP), or more generally polymers carrying aromatic and nitroaromatic groups.

Additional information on the polymers which can be used in the context of the present invention is accessible in the paper by Naudin, 1995 [5].

The term "oxidizing treatment" is understood to mean, in the context of the present invention, a treatment (or pretreatment) targeted at oxidizing the surface of the solid support employed and/or at preparing the surface for a future oxidation by formation of radicals. An oxidation modifies the surface of the solid support, in particular by attaching thereto and/or by introducing therein oxygen-rich groups, such as groups of carboxyl (—COOH), hydroxyl (—OH), alkoxyl (—OR with R as defined below), carbonyl (—C=O), percarbonic (—C—O—OH) and sometimes amide (—CONH) type.

This treatment is based on the use of various reactants in order to produce, at the surface of the polymer constituting the surface of a solid support and/or the solid support, a surface oxidation and/or in order to prepare this surface for a surface oxidation by formation of radicals. The oxidation thus obtained makes possible better attachment and/or a larger amount of polymer grafted by the process as described in international application WO 2008/078052 [4]. This treatment is based on two main types of surface modification based on physical treatments or chemical treatments.

In a first embodiment of the present invention, the oxidizing treatment used is a chemical oxidizing treatment. Advantageously, such a chemical oxidizing treatment is chosen from the group consisting of a Fenton chemical reaction, a treatment with alcoholic potassium hydroxide, a treatment with a strong acid, a treatment with sodium hydroxide, a treatment with a strong oxidizing agent, a treatment with ozone and their combinations.

The term "combinations" is envisaged as meaning that the chemical oxidizing treatment employs at least two of the treatments listed above. By way of example, such a combination can consist of a treatment with a strong oxidizing agent, followed by a Fenton chemical reaction.

The term "Fenton chemical reaction" is understood as meaning the reaction described by Fenton in 1894 which makes it possible to produce hydroxyl radicals by reaction of aqueous hydrogen peroxide solution with iron(II), represented by the following reaction scheme:

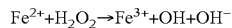
$$Fe^{2+} + H_2O_2 \rightarrow Fe^{3+} + OH + OH^-$$

In the context of the present invention, the Fenton chemical reaction consists in bringing the surface of the solid support and/or the solid support into contact with a solution comprising ferrous ($Fe^{2+}$) ions and a compound of formula ROOR in which R represents a hydrogen, an alkyl group comprising from 1 to 15 carbon atoms, an acyl group —COR', with R' representing an alkyl group comprising from 1 to 15 carbon atoms, or an aroyl group —COAr, with Ar representing an aromatic group comprising from 6 to 15 carbon atoms. Radicals of type OR with R as defined above are obtained by cleaving the peroxide ROOR with $Fe^{2+}$ ions.

The term "alkyl group comprising from 1 to 15 carbon atoms" is understood to mean a linear, branched or cyclic and optionally substituted alkyl group comprising from 1 to 15 carbon atoms, in particular from 1 to 10 carbon atoms and especially from 2 to 6 carbon atoms and optionally a heteroatom, such as N, O, F, Cl, P, Si, Br or S.

The term "aromatic group comprising from 6 to 15 carbon atoms" is understood to mean, in the context of the present invention, an optionally substituted aromatic or heteroaromatic group composed of one or more aromatic or heteroaromatic rings each comprising from 3 to 10 atoms, it being possible for the heteroatom or heteroatoms to be N, O, P or S.

The term "substituted" is understood to mean, in the context of the present invention, an alkyl or aromatic group which is mono- or polysubstituted by a linear or branched alkyl group comprising from 1 to 4 carbon atoms, by an amine group, by a carboxyl group and/or by a nitro group.

The ferrous ($Fe^{2+}$) ions are present in the solution comprising ferrous ($Fe^{2+}$) ions and a compound of formula ROOR at a concentration advantageously of between 0.05M and 5M, in particular between 0.1M and 3M and especially between 0.25M and 2M. The solution comprising ferrous ($Fe^{2+}$) ions and a compound of formula ROOR additionally comprises counterions, such as tetrafluoroborate, sulfate or chloride.

The compound of formula ROOR is present in the solution comprising ferrous ($Fe^{2+}$) ions and a compound of formula ROOR at a concentration of between 0.1M and 5M, in particular between 0.5M and 3M and especially between 1M and 2.5M.

The solution comprising ferrous ($Fe^{2+}$) ions and a compound of formula ROOR is advantageously an acidic solution. The term "acidic solution" is understood to mean a solution having a pH of less than 7, in particular of between 2 and 4 and especially of the order of 3 (i.e. 3±0.5). This solution additionally comprises sulfuric acid, in particular at a concentration of between 0.05 mM and 50 mM, especially between 0.1 mM and 10 mM and more particularly of the order of 1 mM (i.e. 1 mM±0.25 mM).

The duration of the treatment by Fenton chemical reaction can be variable. As nonlimiting examples, this duration is advantageously between 5 min and 5 h, in particular between 10 min and 3 h, especially between 15 min and 2 h and more particularly of the order of 25 min (i.e. 25±5 min).

A treatment with alcoholic potassium hydroxide consists in bringing the surface of the solid support and/or the solid support into contact with an alcoholic potassium hydroxide solution.

The term "alcoholic potassium hydroxide solution" is understood to mean potassium hydroxide diluted in a solution comprising an alcohol as solvent, hereinafter denoted alcoholic solution. Advantageously, this alcohol is chosen from the group consisting in methanol, ethanol and propanol. This alcohol is preferably ethanol.

The concentration of KOH in the alcoholic solution is between 0.1M and 10M, in particular between 0.5M and 5M and especially of the order of 3.5M (i.e. 3.5M±0.5M).

The duration of the treatment with alcoholic potassium hydroxide can be variable. As nonlimiting examples, this duration is advantageously between 5 min and 5 h, in particular between 10 min and 3 h and especially between 20 min and 2 h.

The treatment with alcoholic potassium hydroxide is more particularly suitable for fluoropolymers, such as PVDF. This is because their oxidation by an alcoholic potassium hydroxide solution results in a defluorination of the surface of the polymer with the creation of —CH═CF— bonds and their oxidized equivalent. These bonds are reactive due to the presence of the fluorine atom.

A treatment with a strong acid consists in bringing the surface of the solid support and/or the solid support into contact with a solution of strong acid or of a mixture of strong acids. Such a treatment increases the number of oxygen-comprising groups by surface oxidation.

Any strong acid can be used in the context of an oxidizing treatment with a strong acid according to the present invention. As nonlimiting examples, the strong acid is advantageously chosen from the group consisting of HCl, $H_2SO_4$, $HNO_3$, $HClO_4$ and their mixtures.

The ratio by weight of strong acid of the solution of strong acid(s) can be variable. As nonlimiting examples, this concentration is advantageously between 10 and 100% by weight, in particular between 50 and 95% by weight and especially between 70 and 90% by weight.

The duration of the treatment with the strong acid can be variable. As nonlimiting examples, this duration is advantageously between 1 min and 5 h, in particular between 1 min and 3 h and especially between 1 min and 1 h.

A treatment with sodium hydroxide consists in bringing the surface of the solid support and/or the solid support into contact with a sodium hydroxide solution.

The ratio by weight of sodium hydroxide of the solution can be variable. As nonlimiting examples, this concentration is advantageously between 10 and 100% by weight, in particular between 15 and 70% by weight and especially between 20 and 50% by weight.

The duration of the treatment with sodium hydroxide can be variable. As nonlimiting examples, this duration is advantageously between 1 min and 5 h, in particular between 1 min and 3 h and especially between 1 min and 1 h.

A treatment with a strong oxidizing agent consists in bringing the surface of the solid support and/or the solid support into contact with a solution of a strong oxidizing agent. This solution of a strong oxidizing agent can be neutral, acidic or basic.

Advantageously, this solution is acidic. More particularly, the strong oxidizing agent is chosen from the group consisting of $KMnO_4$, $K_2Cr_2O_7$, $KClO_3$, $CrO_3$ and their mixtures, in hydrochloric acid, sulfuric acid or nitric acid. The following are thus envisaged as solutions of strong oxidizing agent: $KMnO_4/HCl$, $K_2Cr_2O_7/HCl$, $KClO_3/HCl$, $CrO_3/HCl$, $KMnO_4/H_2SO_4$, $K_2Cr_2O_7/H_2SO_4$, $KClO_3/H_2SO_4$, $CrO_3/H_2SO_4$, $KMnO_4/HNO_3$, $K_2Cr_2O_7/HNO_3$, $KClO_3/HNO_3$ and $CrO_3/HNO_3$.

The concentration of $KMnO_4$, $K_2Cr_2O_7$, $KClO_3$ or $CrO_3$ in hydrochloric acid, in sulfuric acid or in nitric acid is advantageously between 10 mM and 1M, in particular between 0.1M and 0.5M and especially of the order of 0.2M (i.e. 0.2M±50 mM).

The concentration of hydrochloric acid, of sulfuric acid or of nitric acid in the solution of strong oxidizing agent is advantageously between 0.1M and 10M, in particular between 0.5M and 5M and especially of the order of 3.5M (i.e. 3.5M±0.5M).

The duration of the treatment with a strong oxidizing agent can be variable. As nonlimiting examples, this duration is advantageously between 1 min and 3 h, particularly between 5 min and 1 h, especially between 10 min and 30 min and more particularly of the order of 15 min (i.e. 15 min±5 min).

A treatment with ozone consists in exposing the surface of the solid support and/or the solid support to ozone. This exposure can involve either bringing the surface of the solid support and/or the solid support into contact with a stream of ozone or placing the surface of the solid support and/or the solid support in an atmosphere comprising ozone.

The necessary ozone can be obtained from a gas rich in oxygen, such as air, oxygen, air enriched in oxygen or a gas enriched in oxygen, via an ozone generator, such as a UVO-Cleaner Model 42-200 comprising a low pressure mercury vapor lamp (28 mW/cm$^2$, 254 nm).

The duration of the treatment with ozone can be variable. As nonlimiting examples, this duration is advantageously between 30 sec and 3 h, in particular between 1 min and 1 h, especially between 5 min and 30 min and more particularly of the order of 10 min (10 min±3 min).

The chemical oxidizing treatment can consist of an electrochemical pretreatment. Such a treatment, which consists in immersing the substrate to be oxidized in an electrochemically generated oxidizing solution, is described in particular in the paper by Brewis and Dahm, 2001 [6]. International application WO 2007/042659 also describes such an electrochemical pretreatment, denoted in this document by Electro-Fenton [7].

In a second embodiment of the present invention, the oxidizing treatment used is a physical oxidizing treatment. This physical oxidizing treatment consists of a treatment by the dry route, the aim of which is to directly oxidize the surface or to prepare this surface for a future oxidization by formation of radicals. In the case of some treatments by the dry route, there is not necessarily directly an increase in the oxidation number of the surface. This is because this increase in the oxidation number may only take place after immersion in aqueous solution of the treated surface. Advantageously, such a physical oxidizing treatment is chosen from the group consisting of a flame treatment, a treatment by the corona effect, a plasma treatment, a treatment with UV radiation, a treatment with X- or γ-rays, a treatment by irradiation with electrons or with heavy ions, and their combinations.

The term "combinations" is envisaged as meaning that the physical oxidizing treatment employs at least two of the treatments listed above.

Furthermore, in the context of the present invention, at least one chemical oxidizing treatment as defined above and at least one physical oxidizing treatment as defined above can be combined to treat the surface of the solid support.

The flame treatment or "flaming" consists in exposing the surface of the solid support and/or the solid support to a flame. The flame is in particular positioned at a distance from the surface of the solid support and/or from the solid support of between 0.1 cm and 20 cm, in particular between 0.3 cm and 10 cm and more particularly between 0.5 cm and 5 cm.

This flame is advantageously generated by a mixture of at least two gases, the first and the second gases being respectively chosen from the group consisting of hydrogen, methane, ethane and propane and the group consisting of air, ozone and oxygen. The temperature of the flame thus obtained is between 500° C. and 1600° C., in particular between 800° C. and 1400° C. and especially of the order of 1200° C. (i.e. 1200° C.±100° C.)

The high temperatures of this treatment generate active entities which can correspond to radicals, ions or excited molecules. They can have the nature of hydroxyl, carbonyl or carboxyl functional groups.

The duration of the flame treatment is between 0.01 sec and 10 sec, in particular between 0.015 sec and 1 sec and especially between 0.02 sec and 0.1 sec.

The treatment by the corona effect is also known as "corona discharge treatment" and consists in exposing the surface of the solid support and/or the solid support to an ionization field created by passing a high voltage alternating current between two electrodes separated by a distance of a few mm and in particular of 1 mm to 2 mm. Thus, an electrical discharge brought about by the ionization of the medium surrounding a conductor is produced when the electric potential exceeds a critical value but when the conditions do not allow the formation of an arc.

During this ionization, the electrons emitted are precipitated in the electric field and transmit their energy to the molecules of the medium surrounding the surface of the solid support and/or the solid support, which medium is advantageously air or an inert gas optionally enriched in oxygen. This results in splitting of chains of the polymer(s) of the solid support and its spontaneous reactions with the chemical entities present in the medium. Even if the treatment by the corona effect takes place under inert atmosphere without a contribution of oxygen, oxidation due to impurities brings about surface oxidation.

The density of the corona discharge is advantageously between 10 W·min/m$^2$ and 500 W·min/m$^2$, in particular between 20 W·min/m$^2$ and 400 W·min/m$^2$ and especially between 30 W·min/m$^2$ and 300 W·min/m$^2$.

The duration of the treatment by the corona effect is between 0.1 sec and 600 sec, in particular between 1 sec and 120 sec and especially between 10 sec and 50 sec.

The plasma treatment consists in exposing the surface of the solid support and/or the solid support to a plasma.

As a reminder, plasma is a gas in the ionized state, conventionally regarded as a fourth state of matter. The energy necessary for the ionization of a gas is provided by means of an electromagnetic wave (radio frequency or microwave). The plasma is composed of neutral molecules, of ions, of electrons, of radical entities (chemically highly active) and of excited entities which will react with the surface of the materials.

A distinction is made between "cold" plasmas and "hot" plasmas, which differ from one another with regard to the degree of ionization of the entities present in the plasma. For "cold" plasmas, the degree of ionization of the reactive entities is less than $10^{-4}$ whereas, for "hot" plasmas, is greater than $10^{-4}$. The terms "hot" and "cold" come from the fact that the "hot" plasma is much more energetic than the "cold" plasma. In the case of an oxidizing pretreatment according to the present invention, cold plasma is more suitable. However, whether the plasma employed is cold or hot, the treatment results in both cases in the appearance at the surface of the solid support of oxygen-rich functional groups.

The plasma is advantageously generated by a mixture of two gases, the first and the second gases being respectively chosen from the group consisting in inert gases and the group consisting in air and oxygen.

The duration of the plasma treatment is between 1 sec and 5 min, in particular between 10 sec and 60 sec and especially between 20 sec and 40 sec.

The treatment with UV radiation consists in subjecting the surface of the solid support and/or the solid support to UV light.

Advantageously, the UV light employed exhibits a wavelength of between 10 nm and 400 nm, in particular between 100 nm and 380 nm and especially between 180 nm and 360 nm.

Any UV source can be used to generate such UV light. Mention may be made, by way of example, of a UV lamp, a low pressure mercury lamp, a medium pressure mercury lamp, a high pressure mercury lamp, a very high pressure mercury lamp, an electric arc lamp, a halide lamp, a xenon lamp, a laser, an ArF excimer laser, a KrF excimer laser, an excimer lamp or synchrotron radiation.

The treatment with UV radiation in the context of the present invention can be carried out at a temperature of between 5° C. and 120° C., in particular between 10° C. and 80° C. and especially between 15° C. and 40° C. More particularly, the treatment with UV radiation according to the invention is carried out at ambient temperature. The term "ambient temperature" is understood to mean a temperature of 20° C.±5° C.

This treatment with UV radiation is advantageously carried out under gas and in particular in the presence of a gas rich in oxygen and/or in ozone, such as air, oxygen, ozone, air enriched in oxygen and/or in ozone or a gas enriched in oxygen and/or in ozone. This is because the photooxidation of the surface of the solid support, i.e. UV irradiation, in the presence of oxygen and/or of ozone makes possible the introduction of oxygen at the surface of a polymer material constituting said solid support.

The treatment with UV radiation in the context of the present invention lasts from 1 min to 5 h, in particular from 5 min to 1 h and especially from 10 min to 45 min. Irradiation can be carried out just once or can be repeated several times, in particular from 2 to 20 times and especially from 3 to 10 times.

The treatment with X- or γ-rays consists in subjecting the surface of the solid support and/or the solid support to X- or γ-radiation (i.e. electromagnetic radiation).

Advantageously, the X-radiation employed exhibits a wavelength of less than 5 pm and the γ-radiation employed exhibits a wavelength of between 5 pm and 10 nm.

Any source which makes it possible to generate X- or γ-radiation, capable of directing it toward the surface of the solid support according to the invention and known to a person skilled in the art can be used in the context of the present invention. By way of example, the γ-radiation can be emitted by a radioactive source, such as cobalt-60 or cesium-137, present in a gamma device.

The treatment with X- or γ-rays in the context of the present invention can be carried out at a temperature of between 5° C. and 120° C., in particular between 10° C. and 80° C. and especially between 15° C. and 40° C. More particularly, the treatment with X- or γ-rays according to the invention is carried out at ambient temperature. The term "ambient temperature" is understood to mean a temperature of 20° C.±5° C.

This treatment with X- or γ-rays is advantageously carried out in the presence of a gas rich in oxygen, such as air, oxygen, air enriched in oxygen or a gas enriched in oxygen. This is because, even though the very high energy of the photons emitted allows them to pass through the material, the presence of oxygen during the irradiation brings about the formation of radicals at the surface of the polymer (i.e. at the surface of the solid support). These radicals then react with the ambient oxygen to form oxygen-rich functional groups at the surface of the solid support.

The duration of the treatment with X- or γ-rays is between 1 min and 2 h, in particular between 5 min and 1 h and especially between 10 min and 30 min.

The treatment by irradiation with electrons or with heavy ions consists in subjecting the surface of the solid support and/or the solid support to an electron beam (also known as "electron irradiation") or to bombardment by heavy ions.

The step consisting in subjecting the surface of the solid support and/or the solid support to an electron beam can consist in sweeping the surface of the solid support and/or the solid support with a beam of accelerated electrons, it being possible for this beam to be emitted by an electron accelerator (for example, a Van de Graaf accelerator, 2.5 MeV). The dose of the electron irradiation can vary from 5 kGy to 1000 kGy, in particular from 10 kGy to 500 kGy and especially from 50 kGy to 150 kGy.

The term "heavy ions" is understood to mean ions having a mass greater than that of carbon. Generally, they are ions chosen from krypton, lead and xenon. This step can consist in bombarding the surface of the solid support and/or the solid support with a beam of heavy ions, such as a beam of Pb or a beam of Kr ions. The intensity of the beam of ions is advantageously between 0.1 MeV/amu and 100 MeV/amu, in particular between 1 MeV/amu and 50 MeV/amu and especially between 4-MeV/amu and 20 MeV/amu.

The treatment by irradiation with electrons or with heavy ions in the context of the present invention can be carried out at a temperature of between 5° C. and 120° C., in particular between 10° C. and 80° C. and especially between 15° C. and 40° C. More particularly, the treatment by irradiation with electrons or with heavy ions according to the invention is carried out at ambiant temperature. The term "ambient temperature" is understood to mean a temperature of 20° C.±5° C.

This treatment by irradiation with electrons or with heavy ions is advantageously carried out in the presence of a gas rich in oxygen, such as air, oxygen, air enriched in oxygen or a gas enriched in oxygen, or after exposure to such a gas. As above, irradiation with electrons or with heavy ions under or after exposure to an atmosphere rich in oxygen makes possible the introduction of oxygen on the surface of the polymers [8].

The duration of the treatment by irradiation with electrons or with heavy ions is between 1 min and 2 h, in particular between 5 min and 1 h and especially between 10 min and 30 min.

In a specific embodiment of the process according to the invention, the oxidizing treatment, both chemical and physical, is carried out in the presence of a mask. The use of a mask during this oxidizing treatment makes it possible to obtain a difference in reactivity between the "blank" surfaces and the "oxidized" (i.e. treated) surfaces. This difference in reactivity can be taken advantage of in producing patterned surfaces since the process as described in international application WO 2008/078052 [4] will be more effective on the "oxidized" surfaces with regard to the "blank" surfaces.

Thus, the surface of the solid support on which the organic film has to be formed is equipped with a mask which covers it at least in part and which protects it during the oxidizing treatment. The mask makes it possible to locally "mask" the chemical reactivity of the surface with regard to the oxidizing treatment.

The mask typically corresponds to a physical entity which is neither grafted to the surface nor covalently bonded to the latter. It can in particular be a bulk substance or a thin layer, typically from a few angstroms to a few microns, of inorganic or organic material deposited on the surface. The mask is advantageously composed of a thin layer which acts as a layer of reduced cohesion which can be easily removed under mild conditions. Typically, the mild conditions correspond to simple chemical washing generally carried out using a solvent in which the mask is soluble, to a treatment with ultrasound in a solvent in which the mask is soluble or to a rise in the temperature.

The material constituting the mask can thus be chosen within a wide range. It will generally be chosen according to the nature of the solid support. Advantageously, the mask is composed of alkanethiols, in particular of long-chain alkanethiols, often $C_{15}$-$C_{20}$ and typically $C_{18}$ alkanethiols.

Masked deposition techniques are known to a person skilled in the art. They can in particular be coating, spraying or dipping. Thus, the mask, in the form of a thin layer of material, can, for example, be deposited either by direct drawing starting from a felt-tip pen impregnated with the chosen material, by the "pad" process and/or by conventional lithographic techniques, such as spin coating, followed by insolation through a physical mask or via a beam of light or of particles which can be guided, and then by development.

Once the surface of the solid support and/or the solid support have been subjected to an oxidizing treatment as defined above and prior to the step of radical chemical grafting, the surface of the solid support and/or the solid support can be rinsed, washed and/or dried.

Advantageously, the surface of the solid support and/or the solid support are subjected to one or more rinsing operation (s), in particular in water, such as Milli-Q water. Subsequently, the surface of the solid support and/or the solid support are subjected to treatment with ultrasound for a period of time of 5 min to 30 min and in particular of the order of 10 min (i.e. 10 min±2 min), before being dried.

The term "radical chemical grafting" during step (ii) refers in particular to the use of molecular entities having an unpaired electron in order to form bonds of covalent bond type with the surface of the solid support, said molecular entities being generated independently of the surface to which they are intended to be grafted. Thus, the radical reaction results in the formation of covalent bonds between the surface of the solid support and the organic film.

The organic film grafted to the polymer constituting the solid support or at least the surface of this support exhibits a length of less than 50 nm, advantageously of less than 40 nm, in particular of less than 30 nm and especially of less than 20 nm.

The organic film grafted to the polymer constituting the solid support or at least the surface of this support is a (co) polymer mainly resulting from several identical and/or different monomer units.

Advantageously, all or a portion of the monomer units employed in the context of the present invention are monomers which can be polymerized by the radical route. The term "monomers which can be polymerized by the radical route" is understood to mean monomers capable of polymerizing under radical conditions after initiation by a radical chemical entity. Typically, they are monomers comprising at least one bond of ethylenic type, i.e. they are molecules of ethylenic type.

Vinyl monomers, in particular the monomers described in international applications WO 2005/033378 and WO 2006/097611, are particularly concerned [9, 10].

According to a particularly advantageous embodiment of the invention, the vinyl monomer or monomers are chosen from monomers of following formula

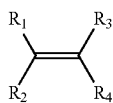

(II)

in which the $R_1$ to $R_4$ groups, which are identical or different, represent a monovalent nonmetallic atom, such as a halogen atom or a hydrogen atom, or a saturated or unsaturated chemical group, such as an alkyl or aryl group, a nitrile, a carbonyl, an amine, an amide or a —$COOR_5$ group in which $R_5$ represents a hydrogen atom or a $C_1$-$C_{12}$ and preferably $C_1$-$C_6$ alkyl group.

The monomers of formula (II) above are chosen in particular from the group consisting of acrylic acid, vinyl acetate, acrylonitrile, methacrylonitrile, methyl methacrylate, ethyl methacrylate, butyl methacrylate, propyl methacrylate, hydroxyethyl methacrylate (HEMA), hydroxypropyl methacrylate, glycidyl methacrylate and their derivatives; ethyl-, propyl-, butyl-, pentyl- and hexylacrylamides and in particular -methacrylamides, cyanoacrylates, diacrylates and dimethacrylates, triacrylates and trimethacrylates, tetraacrylates and tetramethacrylates (such as pentaerythritol tetramethacrylate), styrene and its derivatives, para-chlorostyrene, pentafluorostyrene, N-vinylpyrrolidone, 4-vinylpyridine, 2-vinylpyridine, vinyl, acryloyl or methacryloyl halides, divinylbenzene (DVB) and more generally vinyl crosslinking agents or crosslinking agents based on acrylate, on methacrylate, and on derivatives thereof.

The organic film is grafted to the surface of a solid support indirectly. The term "indirect grafting" is understood to mean the case where a molecular entity separates the (co)polymer constituting the organic film from the surface of the solid support. Thus, this molecular entity is bonded by one covalent bond to the surface of the solid support and by another covalent bond to the organic film.

Such a molecular entity advantageously results from an adhesion primer distinct from the monomer or monomers as defined above. More particularly, such an adhesion primer reacts first of all by radical chemical grafting with the surface of the solid support and then the grafted derivative resulting from the adhesion primer reacts by radical reaction with a monomer as defined above. In this alternative form, it is clear that the (co)polymer forming the organic film can optionally comprise, between some of the monomer units constituting it, one or more units resulting from the adhesion primer used to graft said polymer to the surface of the solid support.

The term "adhesion primer" is understood to mean, in the context of the present invention, any organic molecule capable, under certain conditions, of being chemisorbed at the surface of a solid support by radical reaction, such as a radical chemical grafting. Such molecules comprise at least one functional group capable of reacting with a radical and also a functional group which is reactive with regard to another radical after chemisorption.

The adhesion primer is advantageously a cleavable aryl salt chosen from the group consisting of aryldiazonium salts, arylammonium salts, arylphosphonium salts and arylsulfonium salts. In these salts, the aryl group is an aryl group which can be represented by $R_6$ as defined below.

Mention may in particular be made, among cleavable aryl salts, of the compounds of following formula (I):

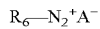 (I)

in which:

A represents a monovalent anion and $R_6$ represents an aryl group.

Mention may advantageously be made, as aryl group of the cleavable aryl salts and in particular of the compounds of formula (I) above, of aromatic carbon or heteroaromatic structures which are optionally mono- or polysubstituted and which are composed of one or more aromatic or heteroaromatic rings each comprising from 3 to 8 atoms, it being possible for the heteroatom or heteroatoms to be N, O, P or S. The substituent or substituents can comprise one or more heteroatoms, such as N, O, F, Cl, P, Si, Br or S, and $C_1$ to $C_6$ alkyl groups in particular.

Among the cleavable aryl salts and in particular the compounds of formula (I) above, $R_6$ is preferably chosen from aryl groups substituted by electron-withdrawing groups, such as $NO_2$, COH, ketones, CN, $CO_2H$, $NH_2$ (in the form of $NH_3^+$), esters and halogens. The $R_6$ groups of aryl type which are particularly preferred are the carboxyphenyl, aminophenyl, nitrophenyl and phenyl radicals.

Among the compounds of formula (I) above, A can be chosen in particular from inorganic anions, such as halides, for example $I^-$, $Br^-$ and $Cl^-$, haloborates, such as tetrafluoroborate, perchlorates and sulfonates, and organic anions, such as alkoxides and carboxylates.

It is particularly advantageous to use, as compounds of formula (I), a compound chosen from the group consisting of phenyldiazonium tetrafluoroborate, 4-nitrophenyldiazonium tetrafluoroborate, 4-bromo-phenyldiazonium tetrafluoroborate, 4-aminophenyldiazonium chloride, 4-aminomethylphenyldiazonium chloride, 2-methyl-4-chlorophenyldiazonium chloride, 4-benzoylbenzenediazonium tetrafluoroborate, 4-cyanophenyldiazonium tetrafluoroborate, 4-carboxyphenyldiazonium tetrafluoroborate, 4-acetamidophenyldiazonium tetrafluoroborate, 4-carboxymethylphenyldiazonium tetrafluoroborate, 2-methyl-4-[(2-methylphenyl)-diazenyl] benzenediazonium sulfate, 9,10-dioxo-9,10-dihydro-1-anthracenediazonium chloride, 4-nitro-naphthalenediazonium tetrafluoroborate and naphthalenediazonium tetrafluoroborate.

In a $1^{st}$ alternative form, step (ii) of the process according to the invention can comprise the following steps consisting in:

a) adding at least one monomer, in particular as defined above, to a solution comprising at least one adhesion primer other than said monomer, in particular as defined above, in the presence of at least one solvent, b) placing the solution obtained in step (a) under nonelectrochemical conditions which make possible the formation of radical entities from the adhesion primer, c) bringing the surface of the solid support into contact with the solution of step (b).

In a $2^{nd}$ alternative form, step (ii) of the process according to the invention can comprise the following steps consisting in:

a') bringing the surface of the solid support into contact with a solution comprising at least one adhesion primer, in particular as defined above, in the presence of at least one solvent and optionally of at least one monomer distinct from said adhesion primer, in particular as defined above, b') placing the surface of the solid support in contact with the solution of step (a') under nonelectrochemical conditions which make possible the formation of radical entities from said adhesion primer, c') optionally adding at least one monomer distinct from said adhesion primer, in particular as defined above, to the solution obtained in step (b').

It is possible, in the $2^{nd}$ alternative form of the process as defined above, to envisage the three following scenarios:

Scenario 1. the monomers are not present in the solution of step (a') and are added only in step (c'). This scenario is particularly advantageous when the monomer used is not very soluble, in particular in aqueous solution; when the monomer is water-insoluble and the adhesion primer is the diazonium salt. Thus, in step (c'), the monomer can be added in solution, in particular in the same solvent as that employed in step (a') and advantageously in the form of an emulsion or of a dispersion produced beforehand using ultrasound or surfactants.

Scenario 2. the monomers are present in the solution of step (a') and the process does not exhibit step (c'). This scenario applies in particular when the primer is a diazonium salt and when the monomer is water-soluble. The process in accordance with the first alternative form can also be used in this scenario.

Scenario 3. a portion of the monomers is present in the solution of step (a') and another portion of the monomers, identical or different in nature, is added only in step (c').

The adhesion primer can either be introduced into the solution(s) or be prepared in situ in the latter.

When the adhesion primer is prepared in situ, use is advantageously made of a precursor of such an adhesion primer. The term "precursor of an adhesion primer" is understood to mean, in the context of the present invention, a molecule separated from said adhesion primer by a single operating step which is easy to carry out.

Generally, the precursors exhibit a greater stability than the adhesion primer under the same environmental conditions. For example, arylamines are precursors of aryldiazonium salts. This is because, by simple reaction, for example with $NaNO_2$ in an acidic aqueous medium or with $NOBF_4$ in an organic medium, it is possible to form the corresponding aryldiazonium salts.

An advantageous precursor employed in the context of the present invention is a precursor of aryldiazonium salts of following formula (III):

$$R_6\text{—}NH_2 \qquad (III),$$

$R_6$ being as defined above.

As nonlimiting examples, a precursor capable of being employed in the context of the present invention is chosen in particular from the group consisting of 4-aminophenylamine (or p-phenylenediamine or 1,4-diaminophenylene), 4-aminobenzoic acid and 4-aminomethylphenylamine.

The amount of adhesion primers or of adhesion primer precursors in the solution of step (a) and (a') can vary as desired by the experimenter. This amount is advantageously between $10^{-6}$M and 5M approximately, preferably between $5 \times 10^{-2}$M and $10^{-1}$M.

The amount of polymerizable monomers in the solution of step (a), (a') and/or (c') can vary as desired by the experimenter. This amount can be greater than the solubility of the monomer under consideration in the solvent of these solutions (i.e. reaction solvent) employed and can represent, for example from 18 to 40 times the solubility of said monomer in the solution at a given temperature, generally at ambient temperature or the reaction temperature. Under these conditions, it is advantageous to employ means which make it possible to disperse the molecules of monomers in the solution, such as a surfactant or ultrasound.

When the solvent is a protic solvent, according to a specific embodiment of the invention, it is recommended to add a surfactant when the monomer exhibits a solubility of less than $5 \times 10^{-2}$M. The surfactants which can be used are in particular anionic surfactants, cationic surfactants, zwitterionic surfactants, amphoteric surfactants and neutral (nonionic) surfactants and in particular the surfactants described in international application WO 2008/078052 [4]. Typically, the concentration of surfactant will be between 0.5 mM and 5M approximately, preferably between 0.1 mM and 150 mM approximately. The recommended concentration of surfactant is usually 10 mM.

Step (ii) of the process is generally carried out under mild conditions which are nondestructive either for the surface of the sample on which it is desirable to graft the film or for the monomer employed. Thus, it is desirable to operate under conditions under which the monomer does not decompose. Furthermore, the temperature of the solutions is limited by the reaction solvent, which it is preferable to keep liquid. Typically, the process is carried out at between 0 and 100° C. and generally under standard temperature and pressure conditions (STPC), according to the place where the user is found, often at approximately 25° C. at a pressure in the vicinity of 1 atm.

The solution employed during steps (a), (a'), (b), (b'), (c) or (c') of the process according to the present invention comprises, as solvent, a solvent which can be:

- either a protic solvent, i.e. a solvent which comprises at least one hydrogen atom capable of being released in the proton form, advantageously chosen from the group consisting of water, deionized water, distilled water, which waters may be acidified or basic, acetic acid, hydroxylated solvents, such as methanol and ethanol, low molecular weight liquid glycols, such as ethylene glycol, and mixtures thereof;
- or an aprotic solvent, i.e. a solvent which is not capable of releasing a proton or of accepting one of them under non extreme conditions, advantageously chosen from dimethylformamide (DMF), acetone, acetonitrile and dimethyl sulfoxide (DMSO);
- or a mixture of at least one protic solvent and of at least one aprotic solvent.

The conditions which make possible the formation of at least one radical entity in step (b) or (b') of the process of the present invention are conditions which make possible the formation of radical entities in the absence of the application of any electrical voltage to the solution of step (b) or (b') or to the solid support.

These conditions involve parameters such as, for example, the temperature, the nature of the solvent, the presence of a specific additive, stirring or pressure, while the electric current is not involved during the formation of the radical entities. There are many conditions which make possible the formation of radical entities and this type of reaction is known and studied in detail in the prior art.

It is thus, for example, possible to act on the thermal, kinetic, chemical, photochemical or radiochemical environment of the adhesion primer in order to destabilize it in order for a radical entity to be formed. It is, of course, possible to act simultaneously on several of these parameters.

In the context of the present invention, the conditions which make possible the formation of radical entities during the grafting step according to the invention are typically chosen from the group consisting of thermal conditions, kinetic conditions, chemical conditions, photochemical conditions, radiochemical conditions and their combinations to which the adhesion primer is subjected. Advantageously, the conditions employed in the context of the grafting step of the process according to the present invention are chosen from the group consisting of thermal conditions, chemical conditions, photochemical conditions, radiochemical conditions and their combinations with one another and/or with the kinetic conditions. The conditions employed in the context of the grafting step of the process according to the present invention are more particularly chemical conditions.

The thermal environment depends on the temperature. It is easy to control with the heating means normally employed by a person skilled in the art. The use of a thermostatically controlled environment is of particular advantage since it makes possible precise control of the reaction conditions.

The kinetic environment corresponds essentially to the stirring of the system and to the frictional forces. In this case, it is not the agitation of molecules in itself (elongation of bonds, and the like) but of the overall movement of the molecules.

Thus, during said grafting step, the solution of step (b) or (b') is subjected to mechanical stirring and/or to treatment with ultrasound. In a first alternative form, the solution employed during step (b) or (b') is subjected to a high rotational speed via a magnetic stirrer and a magnetic bar, for a stirring time of between 5 min and 24 h, in particular of between 10 min and 12 h and especially of between 15 min and 6 h. In a second alternative form, the solution employed during step (b) or (b') is subjected to treatment with ultrasound, in particular by using an ultrasonic bath, typically with an absorption capacity of 500 W and at a frequency of 25 kHz or 45 kHz, for a stirring time of between 1 min and 24 h, in particular of between 15 min and 12 h and especially of between 30 min and 6 h.

Finally, the action of radiation of various types, such as electromagnetic radiation, γ-radiation, UV rays, electron beams or ion beams, can also sufficiently destabilize the adhesion primer for it to form radicals. The wavelength employed will be chosen, without any inventive effort, according to the adhesion primer used.

In the context of the chemical conditions, one or more chemical initiator(s) is (are) employed in the solution made use of during step (b) or (b'). The presence of chemical initiators is often combined with nonchemical environmental conditions, such as set out above. Typically, a chemical initiator, the stability of which is lower than that of the adhesion primer employed under the environmental conditions chosen, will change into an unstable form which will act on the latter and will bring about, starting from the latter, the formation of radical entities. It is also possible to employ chemical initiators having an action not essentially linked to the environmental conditions, which initiators can act over broad ranges of thermal or even kinetic conditions. The initiator will preferably be suited to the environment of the reaction, for example to the solvent employed.

Numerous chemical initiators exist. Generally, three types of them are distinguished, according to the environmental conditions employed:
  thermal initiators, the commonest of which are peroxides or azo compounds. Under the action of heat, these compounds dissociate into free radicals. In this case, the reaction is carried out at a minimum temperature corresponding to that necessary for the formation of radicals starting from the initiator. Chemical initiators of this type are generally used specifically within a certain temperature range, according to their kinetics of decomposition;
  photochemical or radiochemical initiators which are excited by the radiation triggered by irradiation (generally by UV radiation but also by γ-radiation or by electron beams) make possible the production of radicals by more or less complex mechanisms. $Bu_3SnH$ and $I_2$ are included among photochemical or radiochemical initiators;
  essentially chemical initiators, initiators of this type acting rapidly and under standard temperature and pressure conditions on the adhesion primer in order to allow it to form radicals. Such initiators generally have an oxidation/reduction potential which is lower than the reduction potential of the adhesion primer used under the reaction conditions. According to the nature of the adhesion primer, they can thus be, for example, a reducing metal, such as iron, zinc or nickel; a metallocene; an organic reducing agent, such as hypophosphorous acid ($H_3PO_2$) or ascorbic acid; or an organic or inorganic base, in a proportion sufficient to allow destabilization of the adhesion primer.

Advantageously, the reducing metal used as chemical initiator is provided in a finely divided form, such as metal wool or metal filings. Generally, when an organic or inorganic base is used as chemical initiator, a pH of greater than or equal to 4 is generally sufficient. Structures of radical reservoir type, such as polymer matrices irradiated beforehand with an electron beam or with a beam of heavy ions and/or with the combined irradiation means mentioned above, can also be employed as chemical initiators for destabilizing the adhesion primer and for resulting in the formation of radical entities from this primer.

Step (ii) of the process according to the present invention corresponds to the grafting step as defined above. It can last from 10 min to 6 h, in particular from 30 min to 4 h, especially from 1 h to 2 h and more particularly approximately 90 min (i.e. 90 min±10 min).

As the adhesion primer and the monomer which can be polymerized by the radical route are present in a large amount in the solution of step (c) or (c'), the grafting step can be halted before the molecules are attached to the solid support. A person skilled in the art knows different techniques which make it possible to stop the grafting step and will know how to determine the most suitable technique according to the adhesion primer and the polymerizable monomer employed. Mention may be made, as examples of such techniques, of a change in pH of the solution of step (c) or (c'), in particular by adding a basic solution thereto (for example, basic water at a pH of greater than 10), removal of the adhesion primer and polymerizable monomer from the solution of step (c) or (c') (for example by filtration, by precipitation or by complexing) or withdrawal of the solid support from the solution of step (c) or (c').

The present invention also relates to a solid support which has, grafted to a portion of its surface, an organic film as defined above, capable of being prepared by a process according to the present invention. With an oxidizing pretreatment as defined in the present document, the grafted organic film is thicker and the physicochemical properties of the support thus grafted are very greatly modified. Furthermore, from the viewpoint of the modification of the contact angle and thus of the hydrophilicity of the polymers, this is widely confirmed in the present patent application. Varying the contact angle amounts to varying the chemical properties of the material.

The present invention also relates to the use of an oxidizing treatment as defined above for improving a process for the radical chemical grafting of an organic film as defined above to all or part of the surface of the solid support.

This improvement can be demonstrated by comparing the contact angle of a drop positioned on the solid support grafted, by radical chemical grafting, with an organic film as defined above after an oxidizing treatment with the contact angle of a drop with the same volume and of the same nature positioned on the solid support grafted, by radical chemical grafting, with an organic film without oxidizing treatment.

The contact angle of the drop on the solid support grafted after an oxidizing treatment is in particular reduced by 5 to 70% and especially by 20 to 50%, with respect to the contact angle of the drop on the solid support grafted without oxidizing treatment.

This improvement can also be demonstrated by comparing the thickness of an organic film as defined above grafted to the solid support by radical chemical grafting after an oxidizing treatment with a thickness of an organic film grafted under the same conditions (same solvent, same adhesion primer and same monomer, same grafting time) to the solid support without oxidizing treatment. This increase in the thickness can be visualized by IR analysis. This is because, by IR analysis, the bands assigned to the grafted organic film are more visible, which amounts to saying that the thickness of the film is increased.

Other characteristics and advantages of the present invention will become more apparent to a person skilled in the art on reading the examples below, given by way of illustration and without implied limitation, with reference to the appended figures.

DETAILED DESCRIPTION OF SPECIFIC EMBODIMENTS

Figure 1:
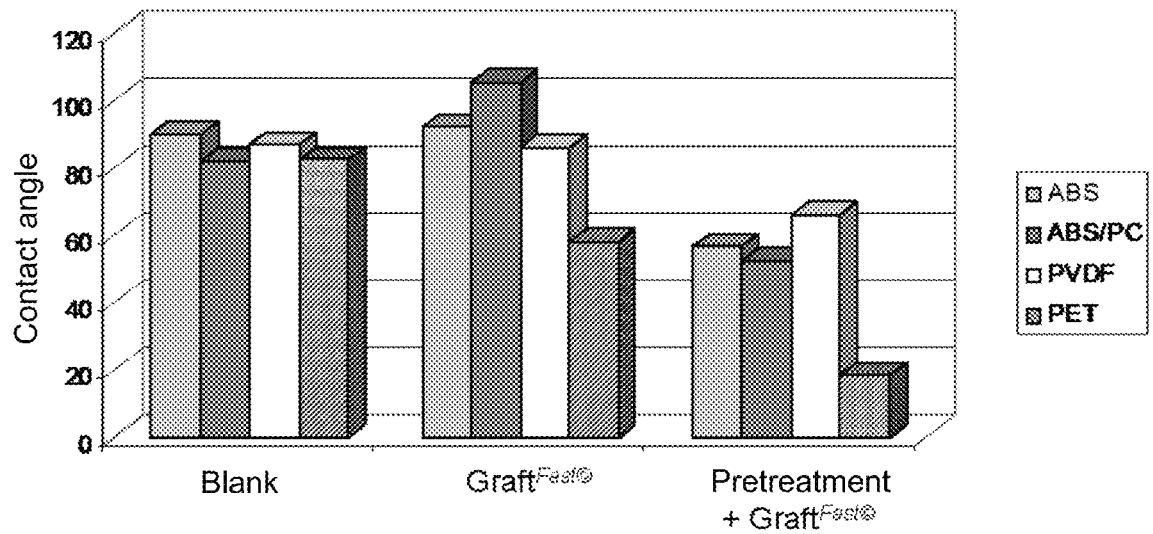
FIG. 1 presents the contact angle measured for a drop of water deposited on an untreated and ungrafted surface made of ABS, ABS/PC, PVDF or PET ("Blank"); a surface made of ABS, ABS/PC, PVDF or PET grafted with PAA according to the process as described in international application WO 2008/078052 [4]("GraftFast®"); and a surface made of ABS, ABS/PC, PVDF or PET pretreated by a Fenton oxidation and then grafted with PAA according to the process as described in international application WO 2008/078052 [4] ("Pretreatment+GraftFast®").

The examples which follow were carried out in a glass vessel.

Unless otherwise specified, they were carried out under standard temperature and pressure conditions (approximately 25° C. under approximately 1 atm) in ambient air. Unless otherwise mentioned, the reactants employed were directly obtained commercially without additional purification.

The strips of gold and the samples of plastics or polymers had a surface area of 1×5 cm$^2$. The samples of plastics tested comprise Acrylonitrile/Butadiene/Styrene (ABS), Acrylonitrile/Butadiene/Styrene-PolyCarbonate (ABS/PC), polypropylene (PP) and polyamide (PA). The samples of polymers tested comprise polyvinylidene fluoride (PVDF), polycarbonate (PC) and polyethylene terephthalate (PET).

No care was taken regarding the composition of the atmosphere and the solutions were not degassed. Before they were used, the samples of plastics or polymers were cleaned beforehand using a solution of industrial detergent (TDF4) under ultrasound for 10 min and then subjected to ultrasound in Milli-Q water for 10 min before being dried.

The various samples were analyzed by IR spectrometry and/or by the measurement of the contact angle between a drop of water with a constant volume (2 µL) deposited on the surface of the samples.

1. Oxidizing Treatments of the Plastics and Polymers

Example 1.1

Oxidation by Fenton Reaction Starting from Iron(II) Tetrafluoroborate

Iron(II) tetrafluoroborate (1.69 g, 5×10$^{-2}$ mol) was dissolved in 100 ml of 0.001M sulfuric acid in water. The samples of plastics and/or polymers were dipped in this solution. 12 ml (0.125 mol) of 35% hydrogen peroxide in water were subsequently added while retaining a constant pH of 3. After 25 min, the samples were rinsed with Milli-Q water and subjected to ultrasound in water for 10 min before being dried.

Example 1.2

Oxidation by Fenton Reaction Starting from Iron(II) Sulfate

Iron(II) sulfate (3.475 g, 5×10$^{-2}$ mol) was dissolved in 25 ml of 0.001M sulfuric acid in water. The samples of plastics and/or polymers were dipped in this solution. 5 ml (0.062 mol) of 35% hydrogen peroxide in water were subsequently added while retaining a constant pH of 3. After 25 min, the samples were rinsed with Milli-Q water and subjected to ultrasound in water for 10 min before being dried.

Example 1.3

Oxidation by Treatment with Alcoholic Potassium Hydroxide 4 g (7.1×10$^{-2}$ mol) of potassium hydroxide were dissolved in 20 ml of 95% ethanol. The samples of polymers were dipped in this solution for a time typically varying from 20 min to 2 h. The samples were rinsed with Milli-Q water and subjected to ultrasound in water for 10 min before being dried.

Example 1.4

Oxidation by Treatment with Ozone

The various plastics and polymers were subjected to a stream of ozone (exposure to an ozone atmosphere) for 10 min.

The ozone generator is a UVO-Cleaner Model 42-200 comprising a low pressure mercury vapor lamp (28 mW/cm$^2$, 254 nm).

Example 1.5

Oxidation by Treatment with KMnO$_4$ 0.75 g of potassium permanganate ($5\times10^{-3}$ mol) were added to 25 ml of a 3.3M sulfuric acid solution.

The samples of plastics and/or polymers were dipped in this solution for 15 min. The various samples were successively rinsed with Milli-Q water and subjected to ultrasound in Milli-Q water before being dried.

In the context of ABS or ABS-PC, the KMnO$_4$ oxidizes and destroys the nodules of polybutadienes present in the ABS and the ABS-PC. The polyacrylonitriles can also be oxidized, in particular to polyamides.

These oxidative modifications are not inevitably visible in the IR spectra for the tests carried out in the context of the present invention. On the other hand, by dipping the polymers in a KMnO$_4$ solution for 6 h, such oxidative modifications could be demonstrated.

Example 1.6

Oxidation by Treatment with KMnO$_4$ (Example 1.5) Followed by a Fenton Reaction (Example 1.2)

The example was carried out according to the forms described in example 1.5. The samples prepared were subsequently introduced into the reaction medium described in example 1.2 for a Fenton reaction, on conclusion of which they were cleaned and dried as described above.

The results obtained for examples 1.1 to 1.6 are presented in table 1 for the measurements of contact angles and in table 2 for the IR spectrometry.

TABLE 1

Measurement of the contact angles of a drop of water (2 μl) with the samples treated according to examples 1.1 to 1.6.

|  | ABS | ABS/PC | PA | PP | PVDF | PC | PET |
|---|---|---|---|---|---|---|---|
| Virgin | 90 | 81.8 | 63.2 | 118.4 | 86.9 | 91.6 | 82.3 |
| Example 1.1 | 36.8 | 44.4 | 71.2 | 92.6 | 61.5 | 29.7 | 42.2 |
| Example 1.2 | 20.8 | 30.1 | / | / | / | / | / |
| Example 1.3 | / | / | / | / | 60.2 | / | / |
| Example 1.4 | 27.6 | 25.2 | 16.6 | 120 | 72.6 | 33.3 | 45 |
| Example 1.5 | 17.9 | 20.3 | / | / | / | / | / |
| Example 1.6 | 17.2 | 17.5 | / | / | / | / | / |

TABLE 2

IR bands which appeared after the oxidizing treatments on the samples

|  | Example 1.1 | Example 1.2 | Example 1.3 | Example 1.5 (After 6 h) | Example 1.6 |
|---|---|---|---|---|---|
| ABS | 3600-3200 cm$^{-1}$ 1670 cm$^{-1}$ | 3600-3200 cm$^{-1}$ 1634 cm$^{-1}$ 1099 cm$^{-1}$ | / | 3200-3150 cm$^{-1}$ 1635 cm$^{-1}$ | 3300-3200 cm$^{-1}$ 1670 cm$^{-1}$ 1103 cm$^{-1}$ |
| ABS/PC | 3600-3100 cm$^{-1}$ 1648 cm$^{-1}$ | 3600-3100 cm$^{-1}$ 1631 cm$^{-1}$ 1079 cm$^{-1}$ | / | 3150-3100 cm$^{-1}$ 1635 cm$^{-1}$ | 3600-3100 cm$^{-1}$ 1640 cm$^{-1}$ 1103 cm$^{-1}$ |
| PA | 3600-3100 cm$^{-1}$ | 3600-3000 cm$^{-1}$ | / | / | / |
| PP | 3600-3100 cm$^{-1}$ 1098 cm$^{-1}$ | 3600-3000 cm$^{-1}$ | / | / | / |
| PVDF | 3600-3110 cm$^{-1}$ 1641 cm$^{-1}$ |  | 1596 cm$^{-1}$ | / | / |
| PC | 3600-3151 cm$^{-1}$ 1646 cm$^{-1}$ |  | / | / | / |
| PET | 3340 cm$^{-1}$ |  | / | / | / |

2. Grafting of a Film According to the Protocol Described in International Application WO 2008/078052 [4] to the Samples of Plastics and/or Polymers Procedure:

The plastics (ABS, ABS/PC, PP and PA) untreated according to the Fenton reaction were cleaned with soapy water under ultrasound for 10 min and then with MQ water for 10 min.

Example 2.1

Grafting of a Poly(Acrylic Acid) Film by the Process as Described in International Application WO 2008/078052 [4] Starting from 4-Aminobenzoic Acid 4-Aminobenzoic acid (2.7 g, $2\times10^{-2}$ mol) was dissolved in a hydrochloric acid solution (100 ml at 0.5M). 100 ml of a solution of NaNO$_2$ (1.38 g, $2\times10^{-2}$ mol) in water were added to the solution.

6.8 ml of acrylic acid AA ($10^{-1}$ mol) and then 2 g of iron filings were added to this diazonium salt solution.

The samples of plastics and/or polymers and a strip of gold were then introduced into the reaction medium for 90 min. The various samples were rinsed successively with Milli-Q water, subjected to ultrasound in a 0.01M sodium hydroxide solution and then rinsed with Milli-Q water, before being dried.

The analysis by IR spectrometry of the strip of gold confirms that the grafting bath was active. The specific bands at 3356 $cm^{-1}$ (COOH deformation), 1710 $cm^{-1}$ (C=O deformation) and 1265 $cm^{-1}$ (C—O deformation) are present.

Example 2.2

Grafting of a Poly(Acrylic Acid) Film by the Process as Described in International Application WO 2008/078052 [4] Starting from 1,4-Diaminophenylene Procedure 1:

The procedure is identical to that of example 2.1, except that the 4-aminobenzoic acid has been replaced by 1,4-diaminophenylene (2.13 g, $2\times10^{-2}$ mol).

The samples of plastics and/or polymers and a strip of gold were then introduced into the reaction medium for 90 min. The various samples were rinsed successively with Milli-Q water, subjected to ultrasound in a 0.01M sodium hydroxide solution and then rinsed with Milli-Q water, before being dried.

Procedure 2:

4-Aminobenzoic acid (1.07 g, $1\times10^{-2}$ mol) was dissolved in a hydrochloric acid solution (100 ml at 0.5M). 100 ml of a solution of $NaNO_2$ (0.69 g, $1\times10^{-2}$ mol) in water were added to this solution. 100 ml of acrylic acid AA (1.46 mol) and then 15 g (0.27 mol) of iron filings were added to this solution of diazonium salt.

The samples of plastics and/or polymers and a strip of gold were then introduced into the reaction medium for 30 min at ambient temperature and then for 90 min in an oven at 38° C. The various samples were rinsed successively with Milli-Q water, subjected to ultrasound in a 0.1M sodium hydroxide solution and then rinsed with Milli-Q water, before being dried.

The analysis by IR spectrometry of the strip of gold confirms that the grafting bath in both procedures was active. The specific bands at 3207 $cm^{-1}$ (COOH deformation), 1720 $cm^{-1}$ (C=O deformation) and 1262 $cm^{-1}$ (C—O deformation) are present.

Example 2.3

Grafting of a Poly(Acrylic Acid) Film by the Process as Described in International Application WO 2008/078052 [4] Starting from 4-nitrobenzenediazonium tetrafluoroborate The procedure is identical to that of example 2.1. 4-Aminobenzoic acid was replaced by 4-nitro-benzenediazonium tetrafluoroborate (4.7 g, $2\times10^{-2}$ mol) and the step of conversion of the diazonium salt precursor to the diazonium salt in the presence of $NaNO_2$ is no longer necessary.

The samples of plastics and/or polymers and a strip of gold were then introduced into the reaction medium for 90 min. The various samples were rinsed successively with Milli-Q water, subjected to ultrasound in a 0.01M sodium hydroxide solution and then rinsed with Milli-Q water, before being dried.

The analysis by IR spectrometry of the strip of gold confirms that the grafting bath was active. The specific bands at 3405 $cm^{-1}$ (COOH deformation), 1695 $cm^{-1}$ (C=O deformation), 1597 $cm^{-1}$ (C=C deformation), 1518 $cm^{-1}$ (N=O deformation), 1345 $cm^{-1}$ (N=O deformation) and 1162 $cm^{-1}$ (C—O deformation) are present.

Example 2.4

Grafting of a Poly(HEMA) Film by the Process as Described in International Application WO 2008/078052 [4] starting from 4-aminobenzoic acid The procedure is identical to that of example 2.1. Acrylic acid AA was replaced by 12.5 ml of 2-hydroxyethyl methacrylate ($10^{-1}$ mol).

The various samples were rinsed successively with Milli-Q water and then dipped in a bath of ethanol under hot conditions for 30 min, before being dried.

The analysis by IR spectrometry of the strip of gold confirms that the grafting bath was active. The specific bands at 3387 $cm^{-1}$ (OH deformation), 1726 $cm^{-1}$ (C=O deformation) and 1160 $cm^{-1}$ (C—O deformation) are present.

Example 2.5

Grafting of a poly(4-vinylpyridine) Film by the Process as Described in International Application WO 2008/078052 [4] Starting from 4-Aminobenzoic Acid The procedure is identical to that of example 2.1. Acrylic acid AA was replaced by 100 ml of a solution of 4-vinylpyridine (4-VP) at 0.1M and $H_2SO_4$ at 1M in water.

The various samples were rinsed successively with Milli-Q water and then dipped in a bath of ethanol under hot conditions for 30 min, before being dried.

The analysis by IR spectrometry of the strip of gold confirms that the grafting bath was active. The specific bands at 3371 $cm^-$ (COOH deformation), 1600 $cm^{-1}$ (C=N deformation) and 1556 $cm^{-1}$ (C=C deformation) are present.

The results obtained by measurements of contact angles for examples 2.1 to 2.5 are presented in table 3.

TABLE 3

|  | ABS | ABS/PC | PA | PP | PVDF | PC | PET |
|---|---|---|---|---|---|---|---|
| Example 2.1 | 92 | 105.4 | 83 | 129 | 86 | 45.8 | 58 |
| Example 2.2 | 78 | 65.9 | 29 | 54 | / | / | / |
| Example 2.3 | 81.8 | 84 | 70.4 | 99.8 | / | / | / |
| Example 2.4 | 50.4 | 88.3 | 54.8 | 105.8 | / | / | / |
| Example 2.5 | 46.2 | 33.8 | 65.8 | 84.4 | / | / | / |

3. Surface Oxidation+Grafting of a Film According to the Process as Described in International Application WO 2008/078052 [4]

Example 3.1

Fenton Oxidation (Example 1.1), Followed by Grafting of a PAA Film by the Process as Described in International Application WO 2008/078052 [4] Starting from 4-Aminobenzoic Acid (Example 2.1)

The example was carried out according to the forms described in example 1.1. The samples prepared were subsequently introduced into the reaction medium described in example 2.1 in order to be subjected to grafting, on conclusion of which they were cleaned and dried as described above.

Example 3.2

Fenton Oxidation (Example 1.1), Followed by Grafting of a PAA Film by the Process as Described in International Application WO 2008/078052 [4] Starting from 1,4-Diaminophenylene (Example 2.2)

The example was carried out according to the forms described in example 1.1. The samples prepared were subsequently introduced into the reaction medium described in example 2.2 in order to be subjected to grafting, on conclusion of which they were cleaned and dried as described above.

Example 3.3

Fenton Oxidation (Example 1.1), Followed by Grafting of a PAA Film by the Process as Described in International Application WO 2008/078052 [4] Starting from 4-Nitrobenzenediazonium Tetrafluoroborate (example 2.3)

The example was carried out according to the forms described in example 1.1. The samples prepared were subsequently introduced into the reaction medium described in Example 2.3 in order to be subjected to grafting, on conclusion of which they were cleaned, and dried as described above.

Example 3.4

Oxidation by Treatment with Alcoholic Potassium Hydroxide (Example 1.3), Followed by Grafting of a PAA Film by the Process as Described in International Application WO 2008/078052 [4] Starting from 4-Aminobenzoic Acid Cbd (Example 2.1)

The example was carried out according to forms described in example 1.3. The samples prepared were subsequently introduced into the reaction medium described in example 2.1 in order to be subjected to grafting, on conclusion of which they were cleaned and dried as described above.

Example 3.5

Oxidation by Treatment with $KMnO_4$ (Example 1.5), Followed by Grafting of a PAA Film by the Process as Described in International Application WO 2008/078052 [4] starting from 1,4-diaminophenylene (Example 2.2)

The example was carried out according to the forms described in example 1.5. The samples prepared were subsequently introduced into the reaction medium described in example 2.2 ($2^{nd}$ procedure) in order to be subjected to grafting, on conclusion of which they were cleaned and dried as described above.

Example 3.6

Oxidation by Treatment with Ozone (Example 1.4), Followed by Grafting of a PAA Film by the Process as Described in International Application WO 2008/078052 [4] Starting from 4-aminobenzoic acid (Example 2.1)

The example was carried out according to the forms described in example 1.4. The samples prepared were subsequently introduced into the reaction medium described in example 2.1 in order to be subjected to grafting, on conclusion of which they were cleaned and dried as described above.

Example 3.7

Fenton Oxidation (Example 1.1), Followed by Grafting of a pHEMA Film by the Process as Described in International Application WO 2008/078052 [4] Starting from 4-Aminobenzoic Acid (Example 2.4)

The example was carried out according to the forms described in example 1.1. The samples prepared were subsequently introduced into the reaction medium described in example 2.4 in order to be subjected to grafting, on conclusion of which they were cleaned and dried as described above.

Example 3.8

Fenton Oxidation (Example 1.1), Followed by Grafting of a p(4-VP) Film by the Process as Described in International Application WO 2008/078052 [4] Starting from 4-Aminobenzoic Acid (Example 2.5)

The example was carried out according to the forms described in example 1.1. The samples prepared were subsequently introduced into the reaction medium described in example 2.5 in order to be subjected to grafting, on conclusion of which they were cleaned and dried as described above.

Example 3.9

$KMnO_4$/Fenton Oxidation (Example 1.5), Followed by Grafting of a PAA Film by the Process as Described in International Application WO 2008/078052 [4] Starting from 1,4-diaminophenylene (Example 2.2)

The example was carried out according to the forms described in example 1.5. The samples prepared were subsequently introduced into the reaction medium described in example 2.2 ($2^{nd}$ procedure) in order to be subjected to grafting, on conclusion of which they were cleaned and dried as described above.

The results obtained by measurements of contact angles for examples 3.1 to 3.9 are presented in table 4.

TABLE 4

|  | ABS | ABS/PC | PA | PP | PVDF | PC | PET |
| --- | --- | --- | --- | --- | --- | --- | --- |
| Example 3.1 | 56.6 | 52.2 | 88 | 115 | 66.1 | 50 | 18.4 |
| Example 3.2 | 36.4 | 24 | 11.2 | 21.6 | / | / | / |
| Example 3.3 | 65.8 | 66 | 63.4 | 91.4 | / | / | / |
| Example 3.4 | / | / | / | / | 63.5 | / | / |
| Example 3.5 | 62.7 | 56.4 | / | / | / | / | / |
| Example 3.6 | 90 | 90.6 | 71 | 106.8 | 68 | 43 | 54.6 |
| Example 3.7 | 39.6 | 38.4 | 57.8 | 79.6 | / | / | / |
| Example 3.8 | 47.4 | 65.2 | 62.8 | 48.4 | / | / | / |
| Example 3.9 | 64.2 | 61.6 | / | / | / | / | / |

4. Effect of the Surface Oxidation on the Creation of a Polymer Film by the Process as Described in International Application WO 2008/078052 [4]

4.1. Improvement of the Oxidizing Pretreatment to the Grafting of a PAA Film by the Process as Described in International Application WO 2008/078052 [4]

An oxidizing pretreatment via a Fenton oxidation makes it possible to enhance the grafting by the method as described in international application WO 2008/078052 [4] of poly(acrylic acid). This enhancement is reflected by a significant reduction in the contact angle measured for a drop deposited on the support made of ABS, ABS/PC, PVDF or PET pretreated and then grafted by the process as described in international application WO 2008/078052 [4] compared with a drop deposited on a support made of blank ABS, ABS/PC, PVDF or PET or a support made of ABS, ABS/PC, PVDF or PET grafted by the process as described in international application WO 2008/078052 [4](FIG. 1).

Table 5 below presents the intensity of the C=O band characteristic of the poly(acrylic acid) by IR analysis. This band is visible only after grafting subsequent to an oxidizing pretreatment via a Fenton oxidation according to the invention.

TABLE 5

| | IR band ν C=O of AA (1706 cm$^{-1}$), % Transmission |
|---|---|
| Virgin PVDF | 0% T |
| PVDF + Example 1.1 | 0% T |
| PVDF + Example 3.1 | 0.72% T |

Figure 2:
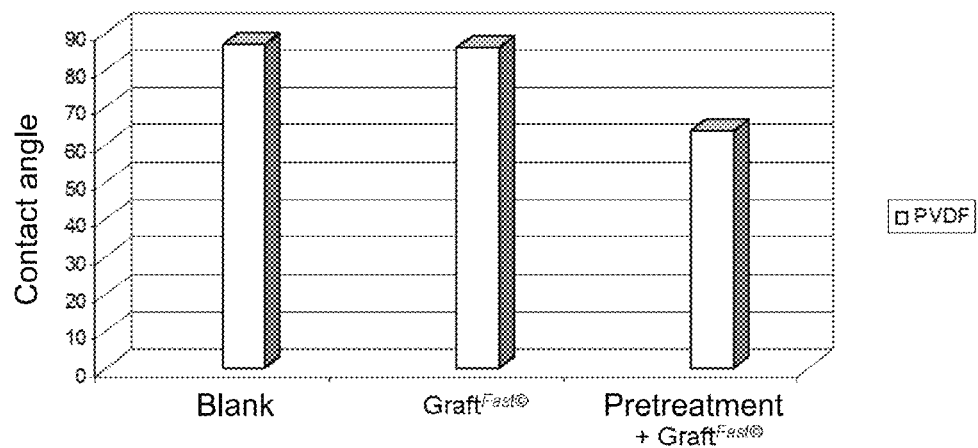
FIG. 2 presents the contact angle measured for a drop of water deposited on an untreated and ungrafted surface made of PVDF ("Blank"); a surface made of PVDF grafted with PAA according to the process as described in international application WO 2008/078052 [4] ("GraftFast®"); and a surface made of PVDF pretreated with alcoholic potassium hydroxide and then grafted with PAA according to the process as described in international application WO 2008/078052 [4] ("Pretreatment+GraftFast®").

An oxidizing pretreatment via a treatment with alcoholic potassium hydroxide makes it possible to enhance the grafting by the method as described in international application WO 2008/078052 [4] of poly(acrylic acid). This enhancement is reflected by a significant reduction in the contact angle measured for a drop deposited on the support made of PVDF pretreated and then grafted by the process as described in international application WO 2008/078052 [4], compared with a drop deposited on a support made of blank PVDF or a support made of PVDF grafted by the process as described in international application WO 2008/078052 [4] (FIG. 2).

Table 6 below presents the intensity of the C=O band characteristic of poly(acrylic acid) by IR analysis. This band, is visible only after grafting subsequent to an oxidizing pretreatment via a treatment with alcoholic potassium hydroxide according to the invention.

TABLE 6

| | IR band ν C=O of AA (1706 cm$^{-1}$), % Transmission |
|---|---|
| Virgin PVDF | 0% T |
| PVDF + Example 1.3 | 0% T |
| PVDF + Example 3.4 | 0.94% T |

Figure 3:
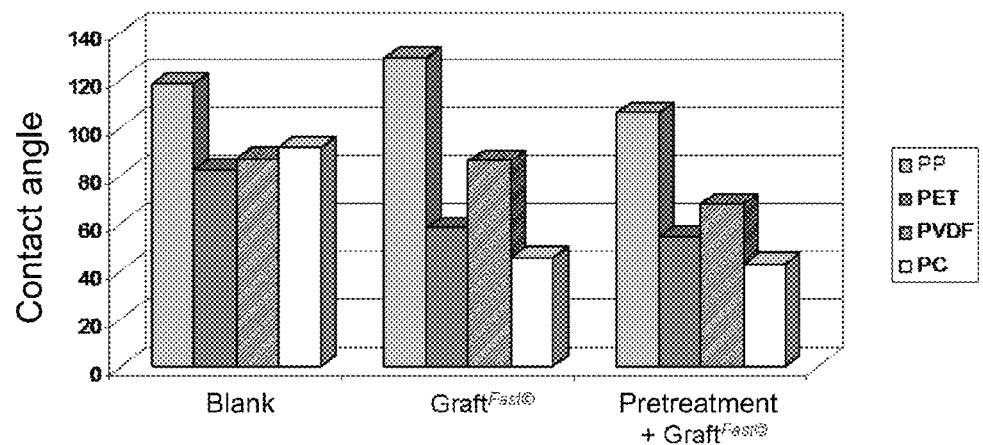
FIG. 3 presents the contact angle measured for a drop of water deposited on an untreated and ungrafted surface made of PP, PET, PVDF or PC ("Blank"); a surface made of PP, PET, PVDF or PC grafted with PAA according to the process as described in international application WO 2008/078052 [4]("GraftFast®"); and a surface made of PP, PET, PVDF or PC pretreated with ozone and then grafted with PAA according to the process as described in international application WO 2008/078052 [4] ("Pretreatment+GraftFast®").

An oxidizing pretreatment via a treatment with ozone makes it possible to enhance the grafting by the method as described in international application WO 2008/078052 [4] of poly(acrylic acid). This enhancement is reflected by a significant reduction in the contact angle measured for a drop deposited on a support made of PVDF pretreated and then grafted by the process as described in international application WO 2008/078052 [4], compared with a drop deposited on a support made of blank PVDF or a support made of PVDF grafted by the process as described in international application WO 2008/078052 [4] (FIG. 3).

The structure of PET and PC fundamentally comprises oxygen-comprising groups. The effect of a pretreatment with ozone is thus weaker with regard to these polymers than with regard to PP and PVDF. Table 7 below presents the intensity of the C=O band characteristic of poly(acrylic acid) by IR analysis. This band is visible only after grafting subsequent to an oxidizing pretreatment via a treatment with ozone according to the invention.

TABLE 7

| | IR band ν C=O of AA (1710 cm$^{-1}$), % Transmission |
|---|---|
| Virgin PP | 0% T |
| PP + Example 1.4 | 0% T |
| PP + Example 3.6 | 0.5% T |

4.2. Improvement of the Oxidizing Pretreatment to the Grafting of a pHEMA Film by the Process as Described in International Application WO 2008/078052 [4]

Figure 4:
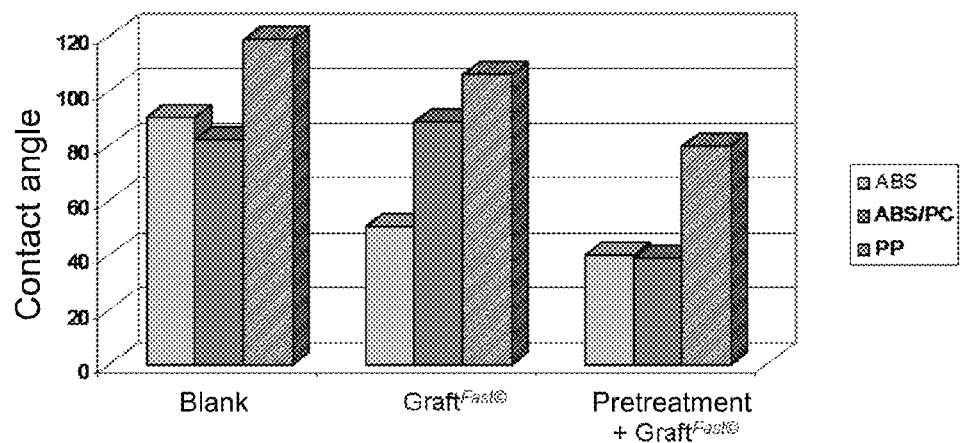
FIG. 4 presents the contact angle measured for a drop of water deposited on an untreated and ungrafted surface made of ABS, ABS/PC or PP ("Blank"); a surface made of ABS, ABS/PC or PP grafted with pHEMA according to the process as described in international application WO 2008/078052 [4] ("GraftFast®"); and a surface made of ABS, ABS/PC or PP pretreated by a Fenton oxidation and then grafted with pHEMA according to the process as described in international application WO 2008/078052 [4] ("Pretreatment+GraftFast®").

An oxidizing pretreatment via a Fenton oxidation makes it possible to enhance the grafting by the method as described in international application WO 2008/078052 [4] of pHEMA. This enhancement is reflected by a significant reduction in the contact angle measured for a drop deposited on the support made of ABS, ABS/PC or PP pretreated and then grafted by the process as described in international application WO 2008/078052 [4], compared with a drop deposited on a support made of blank ABS, ABS/PC or PP or a support made of ABS, ABS/PC or PP grafted by the process as described in international application WO 2008/078052 [4] (FIG. 4).

4.3. Improvement of the Oxidizing Pretreatment to the Grafting of a p(4-VP) Film by the Process as Described in International Application WO 2008/078052 [4]

Figure 5:
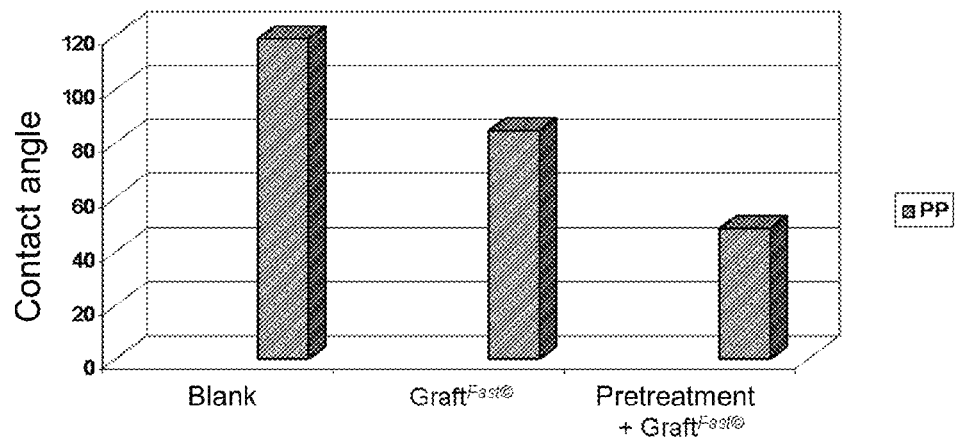
FIG. 5 presents the contact angle measured for a drop of water deposited on an untreated and ungrafted surface made of PP ("Blank"); a surface made of PP grafted with p(4-VP) according to the process as described in international application WO 2008/078052 [4] ("GraftFast®"); and a surface made of PP pretreated by a Fenton oxidation and then grafted with p(4-VP) according to the process as described in international application WO 2008/078052 [4] ("Pretreatment+GraftFast®").

An oxidizing pretreatment via a Fenton oxidation makes it possible to enhance the grafting by the method as described in international application WO 2008/078052 [4] of p(4-VP). This enhancement is reflected by a significant reduction in the contact angle measured for a drop deposited on the support made of PP pretreated and then grafted by the process as described in international application WO 2008/078052 [4], compared with a drop deposited on a support made of blank PP or a support made of PP grafted by the process as described in international application WO 2008/078052 [4] (FIG. 5).

REFERENCES

[1] Palacin et al., "Molecule-to-metal bonds: Electrografting polymers on conducting surfaces", Chem. Phys. Chem., 2004, 5(10), 1469-1481.

[2] Deniau et al., "Carbon-to-metal bonds: Electroreduction of 2-butenenitrile", Surf. Sci., 2006, 600(3), 675-684.

[3] International application WO 03/018212 on behalf of CEA, published on Mar. 6, 2003.

[4] International application WO 2008/078052 on behalf of CEA, published on Jul. 3, 2008.

[5] Naudin, "Nomenclature, classification et formules chimiques des polymères" [Nomenclature, Classification and Chemical Formulae of Polymers], Techniques de l'Ingenieur, 1995, A3035.

[6] Brewis and Dahm, "A review of electrochemical pretreatments of polymers", Intl. J. of Adhesion & Adhesives, 2001, 21, 397-409.

[7] International application WO 2007/042659 on behalf of Alchimer, published on Apr. 19, 2007.

[8] Zenkiewicz et al., "Effects of electron-beam irradiation on surface oxidation of polymer composites", Applied Surface Science, 2007, 253(22), 8992-8999.
[9] International application WO 2005/033378 on behalf of CEA, published on Apr. 14, 2005.
[10] International application WO 2006/097611 on behalf of CEA, published on Sep. 21, 2006.

The invention claimed is:

1. Process for the preparation of an organic film on a portion of the surface of a solid support made of (co)polymer, comprising the successive steps of:
   i) subjecting said surface portion to an oxidizing treatment, wherein said oxidizing treatment oxidizes said surface by attaching to the surface, and/or by introducing into the surface, oxygen rich groups;
   ii) grafting an organic film to said surface portion by radical chemical grafting,
   wherein said organic film is a (co)polymer mainly resulting from one or more distinct monomer units which can be polymerized by the radical route,
   wherein a molecular entity resulting from an adhesion primer is bonded by a covalent bond to said surface of said solid support and by another covalent bond to said organic film wherein the adhesion primer is different from the one or more distinct monomer units,
   wherein said adhesion primer is a cleavable aryl salt chosen from the group consisting of aryldiazonium salts, arylammonium salts, arylphosphonium salts and arylsulfonium salts.

2. Process according to claim 1, characterized in that said oxidizing treatment is a chemical oxidizing treatment.

3. Process according to claim 2, characterized in that said chemical oxidizing treatment is chosen from the group consisting of a Fenton chemical reaction, a treatment with alcoholic potassium hydroxide, a treatment with a strong acid, a treatment with sodium hydroxide, a treatment with a strong oxidizing agent, a treatment with ozone and their combinations.

4. Process according to claim 3, characterized in that said strong oxidizing agent is chosen from the group consisting of $KMnO_4$, $K_2Cr_2O_7$, $KClO_3$, $CrO_3$ and their mixtures, in hydrochloric acid, sulfuric acid or nitric acid.

5. Process according to claim 1, characterized in that said oxidizing treatment is a physical oxidizing treatment.

6. Process according to claim 5, characterized in that said physical oxidizing treatment is chosen from the group consisting of a flame treatment, a treatment by the corona effect, a plasma treatment, a treatment with UV radiation, a treatment with X- or γ-rays, a treatment by irradiation with electrons or with heavy ions, and combinations thereof.

7. Process according to claim 1, characterized in that said surface of said solid support is equipped with a mask.

8. Process according to claim 1, characterized in that the one or more distinct monomer units are chosen from monomers of the following formula (II):

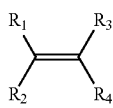

(II)

in which the $R_1$ to $R_4$ groups, which are identical or different, represent a monovalent nonmetallic atom or a saturated or unsaturated chemical group.

9. Process according to claim 8, characterized in that the monovalent nonmetallic atom is a halogen atom or a hydrogen atom.

10. Process according to claim 8, characterized in that the saturated or unsaturated chemical group is chosen from an alkyl group, an aryl group, a nitrile, a carbonyl, an amine, an amide or a $-COOR_5$ group in which $R_5$ represents a hydrogen atom or a $C_1$-$C_{12}$ alkyl group.

11. Process according to claim 1, characterized in that said step (ii) comprises the following steps:
   a) adding the one or more distinct monomer units to a solution comprising the adhesion primer in the presence of at least one solvent,
   b) placing the solution obtained in step (a) under nonelectrochemical conditions which make possible the formation of radical entities from said adhesion primer,
   c) bringing the surface of the solid support into contact with the solution of step (b).

12. Process according to claim 11, characterized in that, during step (b), one or more chemical initiators are used.

13. Process according to claim 1, characterized in that said step (ii) comprises the following steps:
   a) bringing the surface of the solid support into contact with a solution comprising the adhesion primer in the presence of at least one solvent and the one or more distinct monomer units; and
   b) placing the surface of the solid support in contact with the solution of step (a) under nonelectrochemical conditions which make possible the formation of radical entities from said adhesion primer.

14. Process according to claim 13, characterized in that, during step (b), one or more chemical initiators are used.

15. Process according to claim 1, characterized in that said step (ii) comprises the following steps:
   a) bringing the surface of the solid support into contact with a solution comprising the adhesion primer in the presence of at least one solvent and the one or more distinct monomer units;
   b) placing the surface of the solid support in contact with the solution of step (a) under nonelectrochemical conditions which make possible the formation of radical entities from said adhesion primer; and
   c) adding the one or more distinct monomer units to the solution obtained in step (b).

16. Process according to claim 15, characterized in that, during step (b), one or more chemical initiators are used.

17. Process according to claim 1, characterized in that said step (ii) comprises the following steps:
   a) bringing the surface of the solid support into contact with a solution comprising the adhesion primer in the presence of at least one solvent;
   b) placing the surface of the solid support in contact with the solution of step (a) under nonelectrochemical conditions which make possible the formation of radical entities from said adhesion primer; and
   c) adding the one or more distinct monomer units to the solution obtained in step (b).

18. Process according to claim 17, characterized in that, during step (b), one or more chemical initiators are used.

* * * * *